UNITED STATES PATENT OFFICE.

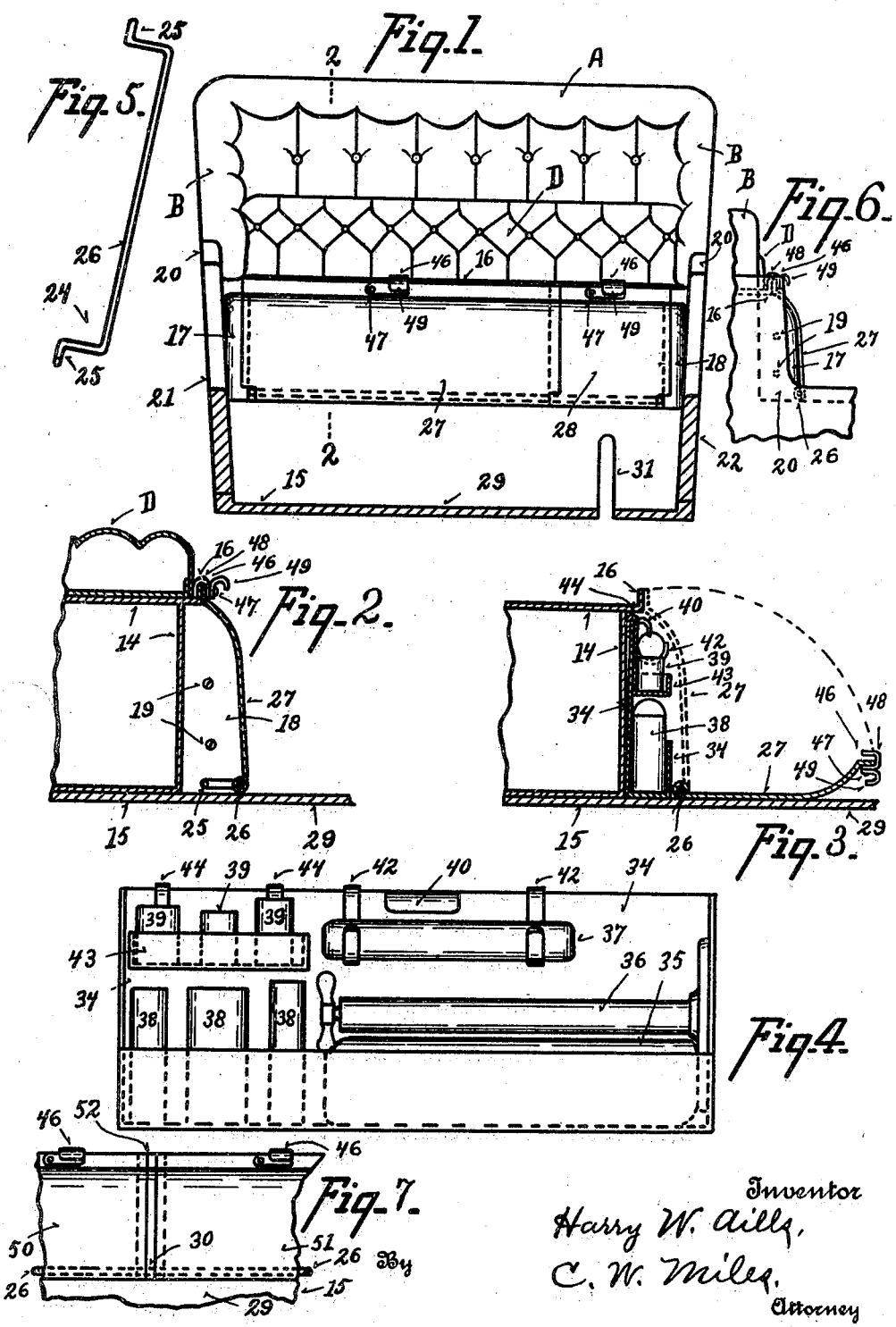

HARRY W. AILLS, OF CINCINNATI, OHIO.

AUTOMOBILE TOOL-BOX.

1,398,884.   Specification of Letters Patent.   Patented Nov. 29, 1921.

Application filed October 20, 1919. Serial No. 331,955.

*To all whom it may concern:*

Be it known that I, HARRY W. AILLS, a citizen of the United States, residing at Cincinnati, in the county of Hamilton and State of Ohio, have invented certain new and useful Improvements in Automobile Tool-Boxes, of which the following is a specification.

My invention relates to improved tool box or tool storage compartment for the storage of tools required to be carried on automobiles. One of its objects is to provide a tool storage compartment which will not inconvenience the operator or passengers when the automobile is in use, and which shall be convenient and accessible when required without requiring the seats to be lifted or the passengers to get out of the machine. Another object is to provide a tool compartment occupying space which would not be otherwise required. Another object is to provide for the orderly storage of the tools where they may be readily reached without disturbing other tools. Another object is to provide for transporting the collection of tools and supplies from their normal storage compartment to the place where the repairs are required, and back to the storage compartment when the repairs have been completed. My invention also comprises certain details of form, combination, and arrangement, all of which will be fully set forth in the description of the accompanying drawings, in which:

Figure 1 is a diagram of the front seat and a portion of the body of an automobile with my improvements applied thereto.

Fig. 2 is a sectional diagram on line 2—2 of Fig. 1, showing the tool compartment in closed position and with the tools and tool rack removed.

Fig. 3 is a sectional diagram similar to Fig. 2 with the tool compartment open and the tools and tool rack or tray in position.

Fig. 4 is a front elevation of the tool rack or tray detached.

Fig. 5 is a perspective view of the tool compartment lid detached.

Fig. 6 is a perspective detail.

Fig. 7 is a detail illustrating a modification.

The accompanying drawings illustrate the preferred embodiments of my invention, in which A represents the back upholstering of the front seat of an automobile, B represents the upholstering at the sides of the front seat. D represents the front seat cushion, which is detachably supported upon the seat section 14 of the automobile body 15, which section 14 usually serves as a compartment for a liquid fuel tank.

The front edge 16 of the section 14 is usually turned upwardly to retain the cushion D in place, and I preferably utilize a space in front of the section 14 for the storage of tools and such other articles as are frequently employed in the operation or repair of automobiles, in order that the tools and articles may be conveniently housed when not in use, and at the same time conveniently reached when required without requiring the occupants of the rear seat of the automobile to vacate the same in order to get at the tools, also to avoid a tool box on one of the running boards, where it would be in the way as well as objectionable in appearance.

In order to provide a tool box or container in the position indicated, I provide two end sections, 17 and 18, which may be of stamped sheet metal or of wood, and which are rigidly connected in position, as for instance by screws 19 connecting them to the side sections 20 of the body of the automobile. Ordinarily members 17 and 18 will be close to the edge of the front doors 21 and 22 of the automobile, and preferably have their edges rounded so as to have the appearance of a portion of the body and to offer no sharp corners or projections liable to catch the clothing or interfere with the occupants, substantially as indicated in Fig. 6. A hinge rod 24 has its ends 25 supported in sockets or recesses in the end sections 17 and 18 respectively, and its middle section 26 serves as a hinge on which the lid sections 27 and 28 turn to open and close the tool compartment. If desired the section 26 may be tied to and supported relative to the floor 29 of the automobile body at one or more places, as for instance at 30 in Fig. 7, but this will not ordinarily be necessary.

The lid sections 27 and 28, where the brake lever is located at one side to travel forward and backward in the slot 31 in the floor 29, are preferably arranged as illustrated in Fig. 1, where the section 28 is located opposite the brake lever, and is designed to cover a relatively small compartment in which to store an inner tube or other article to which access would ordinarily be required with less frequency than to the ordinary tools, thus providing for storing the more frequently required articles behind the lid 27, which lid could be opened as frequently as required without in any way interfering with the brake lever, and providing if necessary for the removal of the articles stored behind the lid 28 without opening the lid 28 where the opening of said lid would be interfered with by the temporary position of the brake lever.

If desired the various tools required may be packed loosely within the space between the end sections and in rear of the lid or lids, and the smaller and more frequently required tools placed separately in loops or pockets carried upon the inner face of said lid or lids. I preferably however provide a tool rack or tray 34, of sheet metal for instance, to seat within and take up the greater portion of the space of said tool storage compartment, said tray having space to receive a lifting jack 35, an air pump 36, a roll or package of small tools 37, and various cans 38 and containers 39 for lubricants and practically all other materials required for the operation or repair of an automobile, all orderly arranged so as to be conveniently selected; said tray being provided with a handle 40 by means of which it may be lifted from the tool storage compartment and carried to any place about the automobile where it may be required, and capable of being quickly replaced and locked in the storage compartment after a repair operation has been completed. As illustrated in Fig. 4 the kit 37 of small tools such as screwdriver, pliers, wrench, punches, etc. is supported on detachable hangers 42 hung over the upper edge of the tray 34. A small detachable tray 43 for the containers 39 is also supported by arms 44 hooked over the upper edge of the container 34. If desired the small tools may be carried loosely in the tray 43, or in a tray similar to tray 43 in place of the kit 37. The tools when packed in said storage compartment, and particularly when packed in the tray and located in said compartment are held against relative displacement, and so as to be practically noiseless. I preferably employ a latch member 46 pivotally attached to the lid member at 47 and having a hook 48 to engage over the upturned edge 16 of the section 14 to firmly press the lid at its upper edge to the face of member 16, while the hook 49 enables the operator to conveniently grasp the latch and operate it to engage or release the lid. Ordinarily the tools so completely fill the storage compartment that as the lid is closed its upper edge requires to be lightly sprung to bring it in contact with the face of member 16, and this assists in resiliently retaining the tools against displacement or the liability of noise due to movement of the tools.

In the modification Fig. 7, which is adapted for use where a brake lever or shifting lever is located near the center of the floor in front of the seat, I have illustrated two lids 50 and 51 and a stationary section 52 of sufficient width to occupy the space opposite the brake or shifting lever, thereby providing for the opening of either or both of the lids 50 and 51 to give access to the tool storage compartment.

I have illustrated the storage compartment as applied to the front of the forward seat section, as being the most convenient position therefor, and a position where the space occupied is not liable to be required for any other purpose or to cause inconvenience, but said compartment, or additional compartments of like nature may be applied to the front of the rear seat, or the rear of the front seat if desired, and said compartment or compartments have the finished appearance of being a part of the original structure.

The apparatus herein illustrated and described is capable of considerable modification without departing from the principle of my invention.

What I claim is:

1. A tool box of the character disclosed comprising an automobile body, a pair of end sections wider at the bottom than at the top facing each other and rigidly attached to said body member and projecting outwardly horizontally from a side wall of said body member, a hinge rod carried by and extending from one of said end sections to the other, a lid hinged at one edge to said hinge rod, and a latch to lock the opposite edge of said lid to said body member, said body member constituting the bottom and one side wall of said box.

2. An automobile tool box comprising an automobile body, a pair of end sections of greater width near the bottom than near the top facing each other and abutting one of the seat sections of the automobile body, a rearwardly inclined tool box lid spanning the space between said end sections and adapted to overlap and rest upon the edges of said respective end sections, said lid being hinged at its lower edge relative to the automobile body and adapted to be latched at its upper edge to the seat section of said body to inclose between said end sections and said seat section and lid a compartment wider near the bottom than near the top and adapted to act as a storage space for a tire pump and substantially all of the other tools designed to be carried by an automobile.

3. A tool box of the character disclosed comprising a vehicle body member, a pair of end sections of greater width near the bottom than near the top facing each other and rigidly attached to said body member, a plurality of lid members respectively hinged at one edge and independently latched at the opposite edge with reference to said body member and end sections to inclose a tool storage space intermediate of said end sections, said body member and said lid member of greater width near the bottom than near the top and adapted to act as a storage compartment for substantially all of the tools designed to be carried by an automobile.

4. A tool box for automobiles comprising an automobile body member constituting the rear wall of the tool storage compartment, a pair of end sections of greater width near the bottom than near the top facing each other and rigidly attached to said body member and projecting outwardly horizontally from a side wall of said body member, a lid member hinged at its lower edge relative to said body member and end sections and adapted when closed to rest upon the edge of the respective end sections and to be latched relative to said body member and end sections at its edge opposite said hinged edge to inclose between said body member end sections and lid a tool storage space, said lid serving when latched to yieldingly engage and hold the tools in place within said compartment against noise or movement.

5. A tool box for automobiles comprising an automobile body the front wall of the forward seat section of which constitute the rear wall of the tool storage compartment, a pair of end sections of greater width near the bottom than near the top facing each other at opposite sides of the forward seat section and rigidly attached to said body, and a lid member hinged at its lower edge relative to said body and end sections and adapted when closed to rest upon the edges of the respective end sections and to be latched to said body member at its upper edge.

6. A tool box for automobiles comprising an automobile body the floor and front wall of the forward seat section of which constitute the bottom and rear wall of the tool storage compartment, a pair of end sections curved at their upper end toward said seat section and facing each other at opposite sides of the forward seat section and rigidly attached to said body, and a lid member curved to conform to the outline of said end sections hinged at its lower edge relative to said body and end sections and adapted when closed to rest upon the edges of the respective end sections and to be latched to said body at its upper edge, said tool box being adapted to act as a storage compartment for substantially all the tools designed to be carried by an automobile.

7. An automobile tool box formed forward of and against the front face of the forward seat section of an automobile, comprising a portion of the automobile body constituting the rear vertical wall of said compartment, sections of greater width near their bottoms than near their tops attached to said body section and constituting the ends of said tool storage compartment, and a movable lid member having its edges in engagement with the edges of said end sections to constitute the front wall of said tool storage compartment said tool storage compartment being of greater depth near its bottom than near its top, and being adapted to contain a tire pump and substantially all the tools designed to be carried by an automobile.

In testimony whereof I have affixed my signature.

HARRY W. AILLS.